June 16, 1925.                                                          1,542,327
H. C. SLINGSBY
HAND TRUCK
Filed June 14, 1924
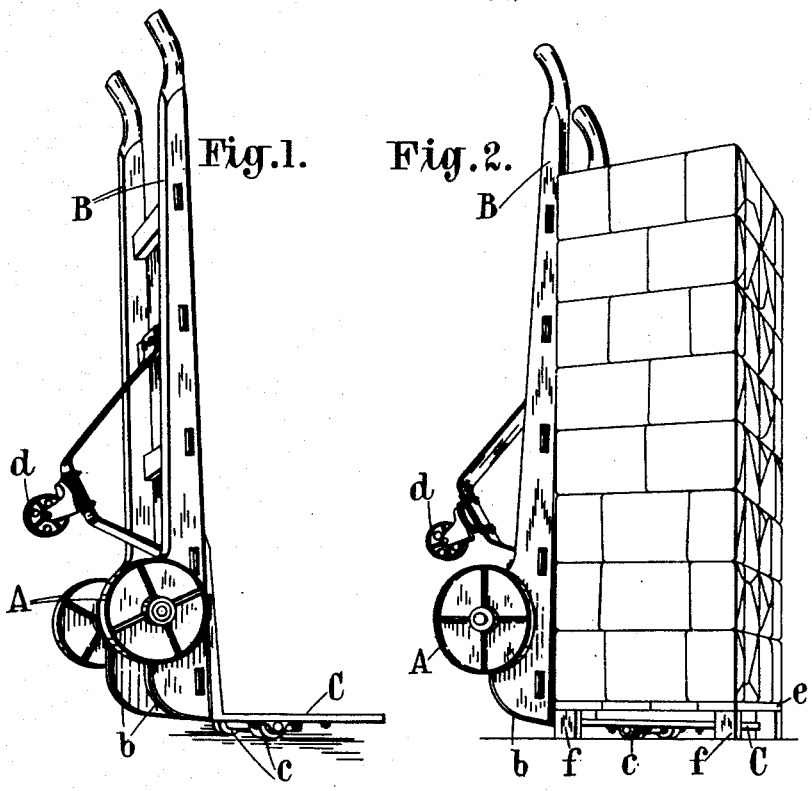
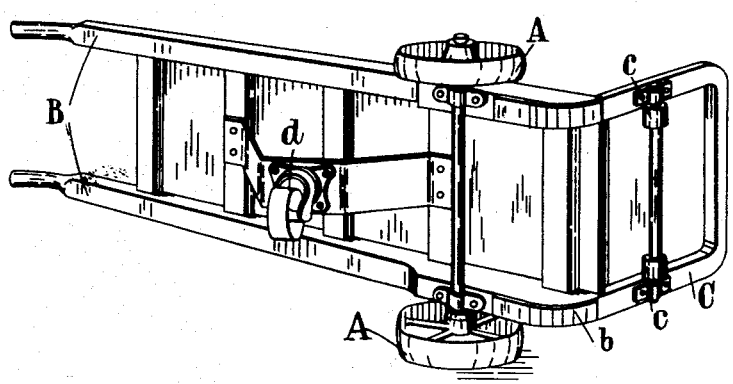
INVENTOR
Harry C. Slingsby
BY
Heard Smith & Tennant
ATTORNEYS.

Patented June 16, 1925.

1,542,327

UNITED STATES PATENT OFFICE.

HARRY C. SLINGSBY, OF LONDON, ENGLAND.

HAND TRUCK.

Application filed June 14, 1924. Serial No. 719,980.

*To all whom it may concern:*

Be it known that I, HARRY CROWTHER SLINGSBY, a British subject, residing at 95 Kingsway, London, W. C. 2, England, have invented certain new and useful Improvements in Hand Trucks, of which the following is a specification.

This invention has reference to improvements in hand trucks, and it consists in an improved hand truck of the type having two wheels mounted on a pair of shafts near their front ends, the said shafts being braced together to form a platform or chassis and their rear ends being formed or provided with handles, and a rigidly mounted lifting plate which projects at right angles to the shafts at their front ends.

The object of the invention is to provide a hand truck adapted for lifting and transporting with ease and safety a heavy load under which the lifting plate can be introduced, and for this purpose the lifting plate is provided with a roller (or rollers) adapted to roll on the ground when the shafts are raised into an approximately vertical position, the shafts are rounded at their front ends so that the truck can rock on the said ends in tilting it to bring the weight of the load to bear on the wheels, and the said wheels are mounted on the shafts at such a distance from the said ends that, when the shafts are in a vertical position and the lifting plate is engaged under a load with its roller positioned a little to the rear of the centre of gravity of the load, the truck can be tilted with a minimum of exertion to bring the weight of the load to bear upon the wheels. The roller constitutes a fulcrum for the first part of the tilting movement, which brings the truck into a position in which it bears partly upon the said roller and partly upon the rounded ends of the shafts. A further tilting movement causes the truck to rock on the rounded ends of the shafts until the wheels touch the ground, in which position the weight of the load is supported partly by the wheels and partly by the rounded ends of the shafts; and a final tilting movement transfers the load entirely to the wheels. The truck is preferably provided with a caster or pair of casters mounted on a bracket or brackets at the rear of the aforesaid wheels to enable the truck to be turned with ease or to be manipulated like a three or four wheeled truck, but I make no claim to that per se.

The invention is illustrated in the accompanying drawing, in which:—

Fig. 1 is a perspective side view of a hand truck embodying a preferred form of the constructional features which constitute the invention.

Fig. 2 shows the same truck with its lifting plate introduced under a loaded platform; and Fig. 3 is a perspective view of the truck lying on its side.

Referring to the drawing, the wheels A are mounted on the shafts B in any usual manner but at some distance from their ends, the said ends of the shafts are curved or rounded and preferably shod with metal bands at $b$, and the lifting plate C is provided on its under side with rollers $c$.

The caster $d$ shown in the drawing enables the truck to be used as a three wheeled truck and also constitutes a safety device when the load is heavy and piled high, besides enabling a loaded truck to be turned with ease in a small space when it is bearing on the wheels A and the caster $d$. The said caster may however be dispensed with, or a pair of casters may be substituted for it.

It is usual to stack goods in warehouses on low platforms $e$ as shown in Fig. 2, and the improved truck has been designed more particularly for transporting such loaded platforms. The height of the platform supports $f$ should be such that the lifting plate C can be readily run under it on the rollers $c$, the said rollers being preferably positioned a little to the rear of the centre of gravity of the load and the diameter of the rollers being such that, when the shafts are in a vertical position, the truck bears upon the floor solely through the said rollers and, when the load is to be moved, the rollers constitute a fulcrum in the first part of the tilting movement.

A comparatively slight pull upon the handles serves to tilt the loaded truck from the position shown in Fig. 2 into a position in which it bears partly upon the rollers $c$ and partly upon the rounded ends $b$ of the shafts; a further pull causes the truck to rock on the said rounded ends until the wheels A touch the floor; and another pull brings it to bear wholly on the wheels.

The bearings of the rollers $c$ may be adjustable to suit different kinds of loads, and a single roller may be employed instead of a pair as shown.

I claim:

The combination in a two-wheeled hand truck of a pair of shafts formed with rounded ends on which the truck can be rocked in a vertical plane when the shafts are raised into an approximately vertical position, a wheel mounted on each shaft at such a distance from its rounded end that the said wheels are clear of the ground when the shafts have been raised to bring the said rounded ends to bear upon the ground, a lifting plate rigidly mounted on said rounded ends and projecting at right angles to the shafts, and a rolling support mounted on the under side of said lifting plate at a point some distance from the rounded ends of said shafts and adapted to roll on the ground when the shafts are raised into a vertical position and also to form a fulcrum in tilting the truck to raise a load under which the lifting plate has been introduced.

H. C. SLINGSBY.